J. H. WELCH.
WEED HOOK.
APPLICATION FILED NOV. 17, 1917.
1,263,174.
Patented Apr. 16, 1918.
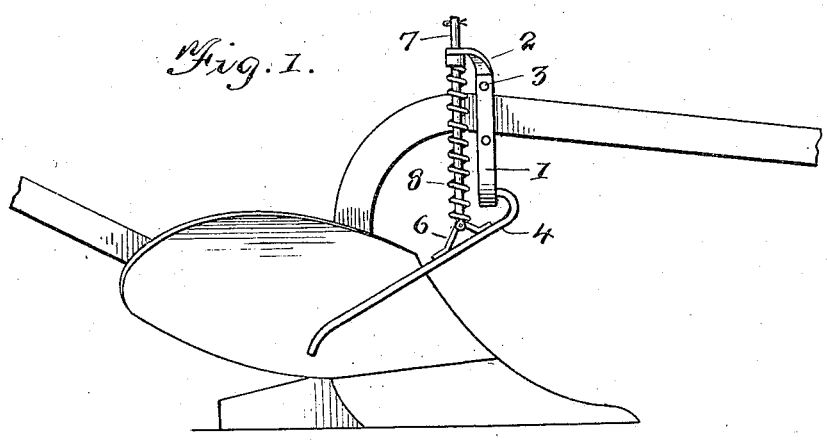
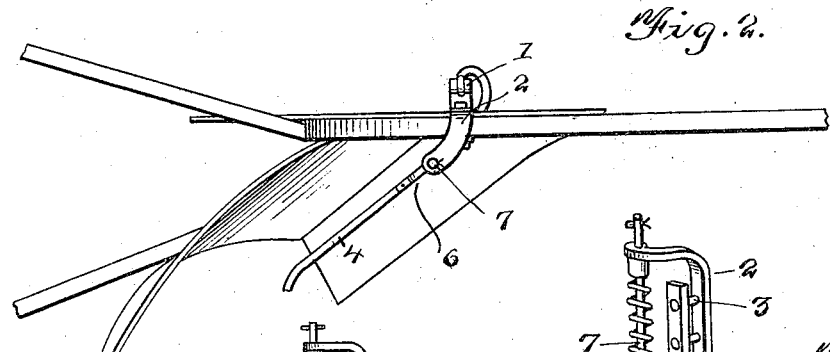
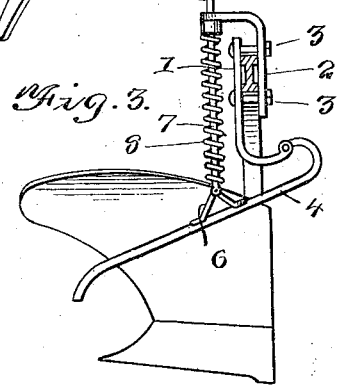
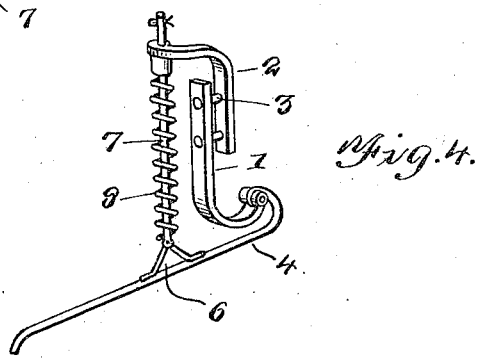
INVENTOR
J. H. Welch
BY Victor J. Evans
ATTORNEY
WITNESSES
E. Q. Ruppert.
L. Wilcox.

UNITED STATES PATENT OFFICE.

JOHN H. WELCH, OF WAUNAKEE, WISCONSIN.

WEED-HOOK.

1,263,174.

Specification of Letters Patent.

Patented Apr. 16, 1918.

Application filed November 17, 1917. Serial No. 202,578.

*To all whom it may concern:*

Be it known that I, JOHN H. WELCH, a citizen of the United States, residing at Waunakee, in the county of Dane and State of Wisconsin, have invented new and useful Improvements in Weed-Hooks, of which the following is a specification.

This invention relates to weed hook attachments especially adapted to be applied to breaking plows and it consists in the novel features hereinafter described and claimed.

An object of the invention is to provide a hook of the character stated which is of simple and durable structure and which when applied to the beam of a plow will effectually turn the weeds, stalks and other material at the surface of a furrow slice under the same when the said slice is turned by the plow.

With the above object in view the structure includes arms adapted to be secured by bolts at the opposite sides of the plow beam, the said arms being provided with curved end portions which lie transversely with relation to the beam when the device is applied. A hook finger is pivotally connected with one of the arms. A rod is pivotally connected with the said hook finger and is slidably received in the curved portion of the other arm. A coil spring surrounds the said rod and is interposed between the last mentioned arm and the said hook finger and is under tension with a tendency to resiliently hold the said hook finger toward the surface of the soil.

In the accompanying drawing:—

Figure 1 is a side elevation of a portion of a plow beam showing the weed hook applied;

Fig. 2 is a top plan view of the same.

Fig. 3 is a front elevation of the same showing the plow beam in section.

Fig. 4 is a perspective view of the weed hook structure.

The weed hook comprises arms 1 and 2 which are adapted to be applied to the opposite sides of a plow beam and which are secured in position thereon by means of bolts 3 which pass transversely through the said arms and which lie adjacent the upper and lower edges of the plow beam. The arm 1 is provided with a curved lower end portion which extends under the plow beam transversely thereof and the arm 2 is provided with an upper curved portion which extends over the upper edge of the plow beam and transversely of the said beam. A finger hook 4 is pivotally connected at its upper end with the lower end of the arm 2 and is disposed under the plow beam with its free end rearwardly disposed in a usual manner. The finger hook 4 is relatively long. The finger hook 4 is provided with a lug 6. A rod 7 is pivotally connected at its lower end with the lug 6 and is slidably received at its upper end portion in the upper end of the arm 2. A coil spring 8 surrounds the intermediate portion of the rod 7 and bears at its upper end against the upper portion of the arm 2 and at its lower end against the lug 6. The spring 8 is under tension with a tendency to hold the free or outer end of the finger 4 toward the surface of the soil.

When the plow is moving along and turning a furrow slice the free end of the finger 4 will encounter the weeds, or other objects at the surface of the furrow slice as the said slice is turning and the said weeds or objects will be forced back under the slice so that when the slice completes its turning movement the said weeds and other objects are completely covered.

From the foregoing description taken in conjunction with the accompanying drawing, it will be seen that a weed hook of simple and durable structure is provided and that the same may be used to advantage for efficiently directing the weeds and other objects under the furrow slice to effect the covering of the same as the slice is turned.

Having described the invention what is claimed is:—

1. A weed hook comprising arms adapted to be applied to the opposite sides of a beam, means for securing the arms to the beam, said arms having end portions which lie transversely with relation to the beam, a finger hook attached to the lower arm, and a spring interposed between the upper arm and said finger hook.

2. A weed hook comprising arms adapted to be applied to the opposite sides of a plow beam and having curved end portions which lie transversely with relation to the beam, means for securing the arms to the beam, a finger hook pivoted to the lower arm, said finger hook being provided with a lug, a rod pivoted to the lug and slidably received in the upper arm and a spring interposed between the upper arm and the said lug.

In testimony whereof I affix my signature.

JOHN H. WELCH.